United States Patent
Zolicoffer et al.

[19]

[11] Patent Number: 6,116,407
[45] Date of Patent: Sep. 12, 2000

[54] CONTAINER CLOSURE FLOW CONTROL

[75] Inventors: Trent F Zolicoffer, Milwaukee; Joseph E Perton, Brookfield, both of Wis.

[73] Assignee: Miller Brewing Company, Milwaukee, Wis.

[21] Appl. No.: 09/201,473

[22] Filed: Nov. 30, 1998

[51] Int. Cl.[7] ................................................ B65G 47/19
[52] U.S. Cl. ......................... 198/530; 198/532; 193/32; 193/40
[58] Field of Search ................................. 198/530, 532; 193/32, 40; 221/251, 212

[56] References Cited

U.S. PATENT DOCUMENTS

| | | | |
|---|---|---|---|
| 2,415,376 | 2/1947 | Strickland, Jr. | 266/5 |
| 2,863,546 | 12/1958 | Josefowicz | 193/32 |
| 3,487,976 | 1/1970 | Matthews | 221/10 |
| 3,670,387 | 6/1972 | Nagao | 29/211 |
| 3,863,802 | 2/1975 | Daniels | 221/68 |
| 4,088,213 | 5/1978 | Nakamura et al. | 193/40 |
| 4,384,658 | 5/1983 | Large | 221/212 |
| 4,530,428 | 7/1985 | Sato et al. | 193/40 |
| 4,554,723 | 11/1985 | Repella | 29/430 |
| 5,426,912 | 6/1995 | Hall et al. | 53/314 |

*Primary Examiner*—Christopher P. Ellis
*Assistant Examiner*—Mark A. Deuble
*Attorney, Agent, or Firm*—Quarles & Brady LLP

[57] ABSTRACT

An apparatus for controlling a flow of gravity fed, magnetic container closures along a path includes an electromagnet proximal to the path. The electromagnet captures at least one container closure flowing along the path in a magnetic field when the electromagnet is energized. The captured container closure blocks the container closure path, and stops the flow of container closures. Circuitry which incorporates a rectifier energizes the electromagnet when the flow of container closures is not desired. When the flow of container closures is desired, the rectifier reverses the current to the electromagnet and the circuitry deenergizes the electromagnet to positively release the captured container closure.

3 Claims, 1 Drawing Sheet

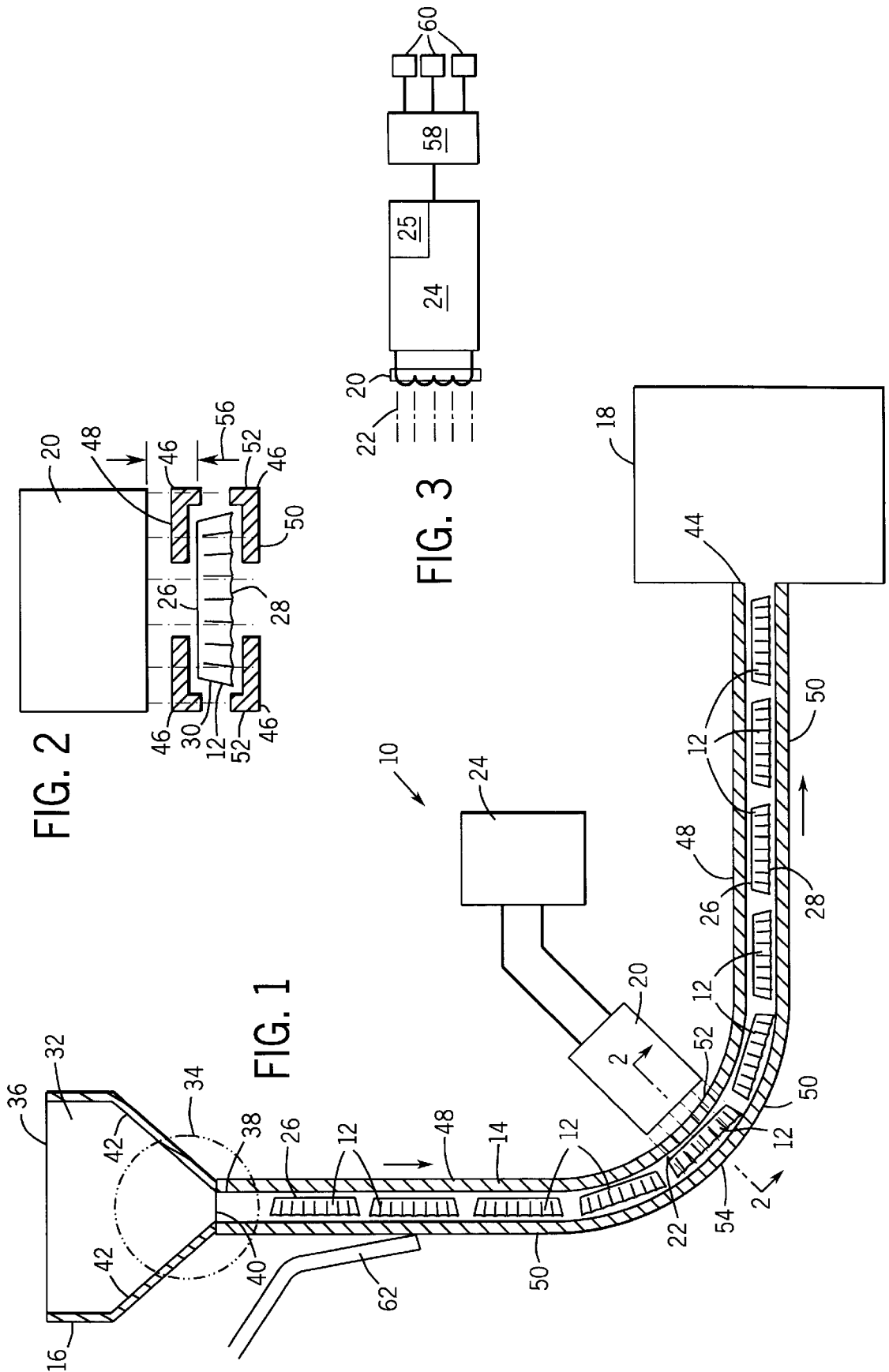

CONTAINER CLOSURE FLOW CONTROL

CROSS REFERENCES TO RELATED APPLICATIONS

Not Applicable

STATEMENT REGARDING FEDERALLY SPONSORED RESEARCH

Not Applicable

BACKGROUND OF THE INVENTION

The invention relates to controlling the flow of gravity fed container closures. More particularly, it provides a flow control apparatus, system, and method for controlling container closures gravity fed from a supply to a bottling line.

A typical bottling line has many operations including bottle cleaning, filling, crowning, labeling, and packaging. The failure of any one operation can cause the entire line to stop until the problem is corrected. The bottling line is preferably operated at high speed. Moreover, when the line is stopped it should be capable of being promptly restarted.

The crowning operation includes passing containers, such as bottles, filled with a product through a crowner which affixes a container closure, such as a bottle cap, to the container, sealing the product inside. A supply of container closures is typically gravity fed to the crowner from a container closure dispenser. When the bottling line stops for other reasons, the flow of container closures into the crowner must be stopped to prevent a jam in the crowner causing a malfunction.

In the past, when stopping of the line is desired, a plunger has been mechanically forced into the path of flowing container closures preventing them from jamming into the crowner. The plunger is a device having moving parts. The plunger is, therefore, a potential source of failure. Therefore, it is desirable to provide an apparatus for controlling gravity fed container closures which does not require moving parts.

BRIEF SUMMARY OF THE INVENTION

The present invention provides an apparatus suitable to control a flow of ferromagnetic container closures that are moving along a path in the apparatus in response to gravity. The apparatus has a chute having an entry, a path extending downward from the entry, and an outlet extending from the path. An electromagnet is mounted proximal to the path for capturing at least one of the container closures in a magnetic field when the closures are positioned in the path. The captured container closure blocks the path and stops the flow of container closures. Circuitry having a polarity reversing means for reversing the polarity in the electromagnet causes the electromagnet to positively release the captured container closure from the magnetic field when the flow of container closures is desired.

A primary object of the invention is to provide a method and apparatus for controlling the flow of container closures without any moving parts. This objective is accomplished by controlling the flow of container closures using an electromagnetic field.

Another objective of the present invention is to provide an apparatus that rapidly restarts the flow of ferromagnetic container closures which are stopped in a chute. This objective is accomplished by providing polarity reversing means in the circuitry electrically connected to the electromagnetic which reverses the electrical polarity of the electromagnet to positively release the container closure from the electromagnetic field.

The foregoing and other objects and advantages of the invention will be apparent from the description which follows. In the description reference is made to the accompanying drawings which form a part hereof, and in which there is shown by way of illustration a preferred embodiment of the invention. However, it is to be understood that the invention is broader than merely the preferred embodiment.

BRIEF DESCRIPTION OF THE DRAWINGS

FIG. 1 is a schematic vertical sectional view of a flow control apparatus incorporating the present invention;

FIG. 2 is a partial cross sectional view taken along line 2—2 of FIG. 1;

FIG. 3 is a block diagram of the flow control apparatus of FIG. 1.

DETAILED DESCRIPTION OF THE PREFERRED EMBODIMENTS

As shown in FIG. 1, there is a flow control apparatus 10 for controlling the flow of iron containing (e.g. steel) container closures 12, such as bottle caps, through a chute 14 from a container supply 16 to a crowner 18. The crowner 18 affixes each container closure 12 to a container (not shown), such as a bottle, in ways well known in the art. The flow control apparatus 10 has an electromagnet 20 for capturing a magnetic container closure 12 in an electromagnetic field 22. It also has circuitry 24 including a polarity reversing means for energizing the electromagnet 20, and importantly for positively releasing the captured container closure 12 from the electromagnetic field 22.

Referring to FIG. 2, the container closures 12 preferably have a top 26, a bottom 28, and downwardly depending sides 30 therebetween. The container closure bottom 28 is placed over the container exposing the top 26 once the container is closed. Preferably, the sides 30 are then deformed inwardly under a container lip by the crowner 18 to seal the container.

Referring back to FIG. 1, supply hopper 32 feeds into funnel 34. The hopper 32 contains a supply of container closures 12 for use by the crowner 18 and has an open top 36 for receiving still more container closures 12 which are poured into the hopper 32 as needed. The funnel 34 feeds an entry 38 near the hopper bottom 40. The caps 12 then fall due to gravity in single file.

Preferably, the funnel 34 also incorporates an orientor which orients each container closure 12 exiting the hopper 32 to ensure that the container closure 12 is correctly orientated in the chute 14 for placement on a container 12 by the crowner 18.

The chute 14 is preferably stainless steel and defines a path from the supply 16 to an exit 44 linked to the crowner 18. Although a stainless steel chute is preferred for use in the food industry, the chute 14 may be made from other suitable magnetic or non-magnetic material.

Looking particularly at FIG. 2, the chute 14 has four spaced corner sections 46 along its length forming a generally rectangular cross section with an open top 48, open bottom 50, and two open sides 52. The corner sections 46 are spaced to provide a path for the container closures 12 to flow by gravity through the chute 14 in a single file relationship without changing orientation. Preferably, each container closure 12 is oriented such that the top of the cap 12 faces the chute top 48 near exit 44.

Referring back to FIG. 1, the chute 14 has a bend 50 for changing the vertical flow direction of the container closures 12 from the container closure exit point 38 to a generally horizontal flow direction. The bend is adapted to accommodate the container closure entry point 44 in the crowner 18. Although a bend 50 in the chute 14 is preferred, any chute configuration that defines a path for gravity fed container closures 12 from the entry 38 to the exit 44 may be used without departing from the scope of the present invention.

The bend 50 has an inside 52 and an outside 54. Preferably, the chute top 48 is on the bend inside 52 to expose the container closure tops 26, which have the maximum amount of magnetic metallic container closure surface area, toward the bend inside 52.

The electromagnet 20 is disposed proximal to the chute 14 for capturing at least one of the container closures 12 passing through the chute 14 in an electromagnetic field 22. By exposing the container closure tops 26 to the electromagnetic field 22, the efficiency of the electromagnet 20 is enhanced requiring a less powerful electromagnet.

Most preferably, the electromagnet is positioned proximal to the chute 14 at the chute bend inside 52. By positioning the electromagnet 20 on the chute bend inside 52, the container closures 12 are in close proximity to the electromagnet 20 along a greater length of the chute 14 than if the electromagnet 20 was positioned along a straight length or the outside bend 54 of the chute 14. Increasing the length of the chute 14 which is exposed to the electromagnet 20 allows a given size of electromagnetic field 22 to capture more container closures 12 in the chute 14, thus further increasing the efficiency of the electromagnet 20.

Referring back to FIG. 2, preferably the electromagnet 20 is bipolar which generates an electromagnetic field 22 of sufficient strength to capture a container closure 12 across an air gap 56. One suitable 12 volt DC electromagnet is Model Mo. EM-R1 available from Adams Magnetics, Melrose Park, Ill. It operates effectively across an air gap 56 of up to 0.015 inches.

Other suitable electromagnets 20 may be used depending upon the particular requirements of the application. For example, a more powerful electromagnet 20 may be used if the chute configuration requires a larger air gap 56 between the flowing container closures 12 and the electromagnet 20. Advantageously, the electromagnet 20 described above is water tight to facilitate cleaning and prevent rust formation on the electromagnet surfaces.

Referring now to FIG. 3, the circuitry 24 includes a polarity reversing means, such as rectifier 25, and provides electrical power to the electromagnet 20 for energizing the electromagnetic field 22. The rectifier 25 reverses the electrical current in the circuitry 24 prior to deenergizing the electromagnet 20 to positively release the captured container closure 12 from the electromagnetic field 22 when the flow of container closures 12 is desired. This is very important in providing a prompt restart.

Preferably, the circuitry 24 provides timed pulses of reverse current to the electromagnet 20 to effectively release the captured container closure 12. One particularly suitable circuitry 24 having a rectifier 25 for use with the EM-R1 electromagnet described above is Rectifier Controller Model No. AU-12-15, available from Magnetrol Inc., Troy, Mich., which provides power to the electromagnet 20 and rapid reverse current cycling for positively releasing the captured container closure 12. Advantageously, the Rectifier Controller Model No. AU-12-15 accepts a signal from a limit switch or Programmable Logic Controller (PLC) indicating whether the electromagnetic field, and thus the flow of container closures 12, is desired.

A microprocessor 58, such as a PLC, receives inputs from sensors 60, such as from limit switches, proximity sensors or the like, positioned along the bottling line to determine if the flow of container closures 12 is desired, and provides a signal to the circuitry 24 indicating whether the flow of container closures 12 is desired. For example, if the bottling line has stopped, the microprocessor 58 will receive at least one input indicating the stopped condition and then provide a first signal to the circuitry 24 to energize the electromagnetic 20. When the bottling line is to resume operation, the microprocessor 58 provides a second signal to the circuitry 24 to positively release the captured container closure 12 by cycling the rectifier 25 and deenergizing the electromagnet 20. Of course, the first signal could be closing a switch in the circuitry, and the second signal could be opening the same switch. Although a microprocessor 58 is preferred and described herein, the signal to the circuitry 24 may be provided by a switch, such as a manual switch, limit switch, or the like, electrically connected to the circuitry 24.

What has been described above is merely the preferred embodiment of the invention. Various changes and modifications can be made therein without departing from the scope of the invention defined by the appended claims. For example, a continuous high pressure air flow 62 may be directed generally along the container closure direction of travel urging the container closures 12 through the chute 14.

Industrial Applicability

The invention provides equipment for use with a crowner in a bottling line to control the flow of magnetic container closures from a hopper to the crowner.

We claim:

1. An apparatus suitable to control a flow of ferromagnetic container closures that are moving along a path in the apparatus in response to gravity, said apparatus comprising:

a chute having an entry, a path extending downward from the entry, and an outlet extending from the path;

an electromagnet mounted proximal to said path for capturing at least one of said container closures in a magnetic field when said closures are positioned in said path when said electromagnet is energized, whereby said captured container closure blocks said path and stops said flow of container closures; and circuitry having a polarity reversing means for reversing the polarity in said electromagnet, said circuitry being electrically connected to said electromagnet for energizing said electromagnet to capture at least one of said container closures when the flow of container closures is not desired, and for positively releasing said captured container closure from said magnetic field when said flow of container closures is desired, wherein said chute has a bend with an inside and an outside, said electromagnet being proximal to said inside of said bend.

2. The apparatus as in claim 1, wherein said polarity reversing means is rectifier.

3. An apparatus as in claim 2, further comprising a microprocessor capable of causing a signal to be sent to the circuitry to indicate flow of the container closures through the chute is desired.

* * * * *